(12) United States Patent
Lim (10) Patent No.: US 11,500,495 B2
(45) Date of Patent: Nov. 15, 2022

(54) TOUCH DISPLAY DEVICE (71) Applicant: LX SEMICON CO., LTD., Daejeon (KR)

(72) Inventor: Hun Yong Lim, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 17/546,412

(22) Filed: Dec. 9, 2021

(65) Prior Publication Data
US 2022/0197416 A1  Jun. 23, 2022

(30) Foreign Application Priority Data

Dec. 18, 2020 (KR) .................. 10-2020-0178115

(51) Int. Cl.
*G06F 3/044* (2006.01)
*G06F 3/041* (2006.01)
*G09G 3/36* (2006.01)

(52) U.S. Cl.
CPC .......... *G06F 3/044* (2013.01); *G06F 3/04166* (2019.05); *G09G 3/3655* (2013.01); *G09G 2310/027* (2013.01); *G09G 2310/0286* (2013.01); *G09G 2310/0291* (2013.01); *G09G 2310/0297* (2013.01); *G09G 2310/08* (2013.01)

(58) Field of Classification Search
CPC ... G06F 3/044; G06F 3/04166; G09G 3/3655; G09G 2310/027; G09G 2310/0286; G09G 2310/0291; G09G 2310/0297; G09G 2310/08
See application file for complete search history.

(56) References Cited

U.S. PATENT DOCUMENTS

| | | | | |
|---|---|---|---|---|
| 9,489,091 B2* | 11/2016 | Park | ............... | G06F 3/0443 |
| 9,817,512 B1* | 11/2017 | Kim | ............... | G06F 3/0443 |
| 10,838,539 B2* | 11/2020 | Hwang | ............... | G06F 3/0416 |
| 10,871,849 B2* | 12/2020 | Choi | ............... | G06F 3/04166 |
| 2014/0340348 A1* | 11/2014 | Park | ............... | G06F 3/0443 |
| | | | | 345/173 |
| 2018/0150177 A1* | 5/2018 | Hwang | ............... | G06F 3/044 |
| 2018/0275827 A1* | 9/2018 | Lin | ............... | G06F 3/0412 |
| 2019/0102036 A1* | 4/2019 | Kim | ............... | G06F 3/0443 |
| 2019/0114013 A1* | 4/2019 | Wu | ............... | G06F 3/04166 |
| 2019/0114980 A1* | 4/2019 | Kim | ............... | G06F 3/044 |

(Continued)

FOREIGN PATENT DOCUMENTS

| | | | |
|---|---|---|---|
| KR | 10-2014-0135564 A | 11/2014 |
| KR | 10-2018-0048294 A | 5/2018 |
| KR | 10-2018-0079555 A | 7/2018 |

*Primary Examiner* — Michael Pervan
(74) *Attorney, Agent, or Firm* — Harness, Dickey & Pierce, P.L.C.

(57) ABSTRACT

A touch display device according to one embodiment of the present disclosure includes a first drive integrated circuit configured to output a source signal and receives a touch sensing signal, and a second drive integrated circuit configured to output the source signal, wherein the first drive integrated circuit outputs the source signal in a display mode and receives the touch sensing signal in a touch sensing mode, the second drive integrated circuit outputs the source signal in the display mode, and the first drive integrated circuit and the second drive integrated circuit have the same resistance value in the display mode.

14 Claims, 5 Drawing Sheets

(56) References Cited

U.S. PATENT DOCUMENTS

| | | | |
|---|---|---|---|
| 2019/0155433 A1* | 5/2019 | Park | G06F 3/04184 |
| 2021/0149474 A1* | 5/2021 | Choi | G06F 3/04166 |
| 2022/0011895 A1* | 1/2022 | Park | G06F 1/3265 |

* cited by examiner

TOUCH DISPLAY DEVICE

CROSS-REFERENCE TO RELATED APPLICATIONS

This application claims the benefit of the Korean Patent Applications No. 10-2020-0178115 filed on Dec. 18, 2020, which is hereby incorporated by reference as if fully set forth herein.

FIELD OF THE INVENTION

The present disclosure relates to a touch display device.

BACKGROUND

Liquid crystal displays (LCDs) using liquid crystals and organic light emitting diode (OLED) displays using OLEDs are representative as display devices for displaying an image.

In recent years, display devices (hereinafter, referred to as a "touch display device") having touch screen panels capable of sensing a touch input by a finger of a user or a stylus pen, breaking away from general input methods such as buttons, keyboards, and mouses, are widely used. The above-described touch display device includes a touch sensing device.

A touch display driving device for driving the touch display device includes a display driving device for driving a display panel and a touch sensing device that detects the presence or absence of a touch and touch coordinates (or touch locations). In detail, the touch sensing device detects a touch sensing signal by driving touch sensors (or touch electrodes) and detects touch information including the presence or absence of the touch or the touch coordinates using the detected touching sensing signal. In this case, when the resistance values of a plurality of display driving device circuits for driving the display panel are different, an image displayed on the display panel may not be uniformly displayed.

SUMMARY

The present disclosure is directed to providing a touch display device that uniformly displays an image.

A touch display device according to one embodiment of the present disclosure includes a first drive integrated circuit configured to output a source signal and receives a touch sensing signal, and a second drive integrated circuit configured to output the source signal, wherein the first drive integrated circuit outputs the source signal in a display mode and receives the touch sensing signal in a touch sensing mode, the second drive integrated circuit outputs the source signal in the display mode, and the first drive integrated circuit and the second drive integrated circuit have the same resistance value in the display mode.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

In the specification, it should be noted that like reference numerals already used to denote like elements in other drawings are used for elements wherever possible. In the following description, when a function and a configuration known to those skilled in the art are irrelevant to the essential configuration of the present disclosure, their detailed descriptions will be omitted. The terms described in the specification should be understood as follows.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part may be added unless 'only' is used. The terms of a singular form may include plural forms unless referred to the contrary.

In construing an element, the element is construed as including an error range although there is no explicit description.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Figure 1:
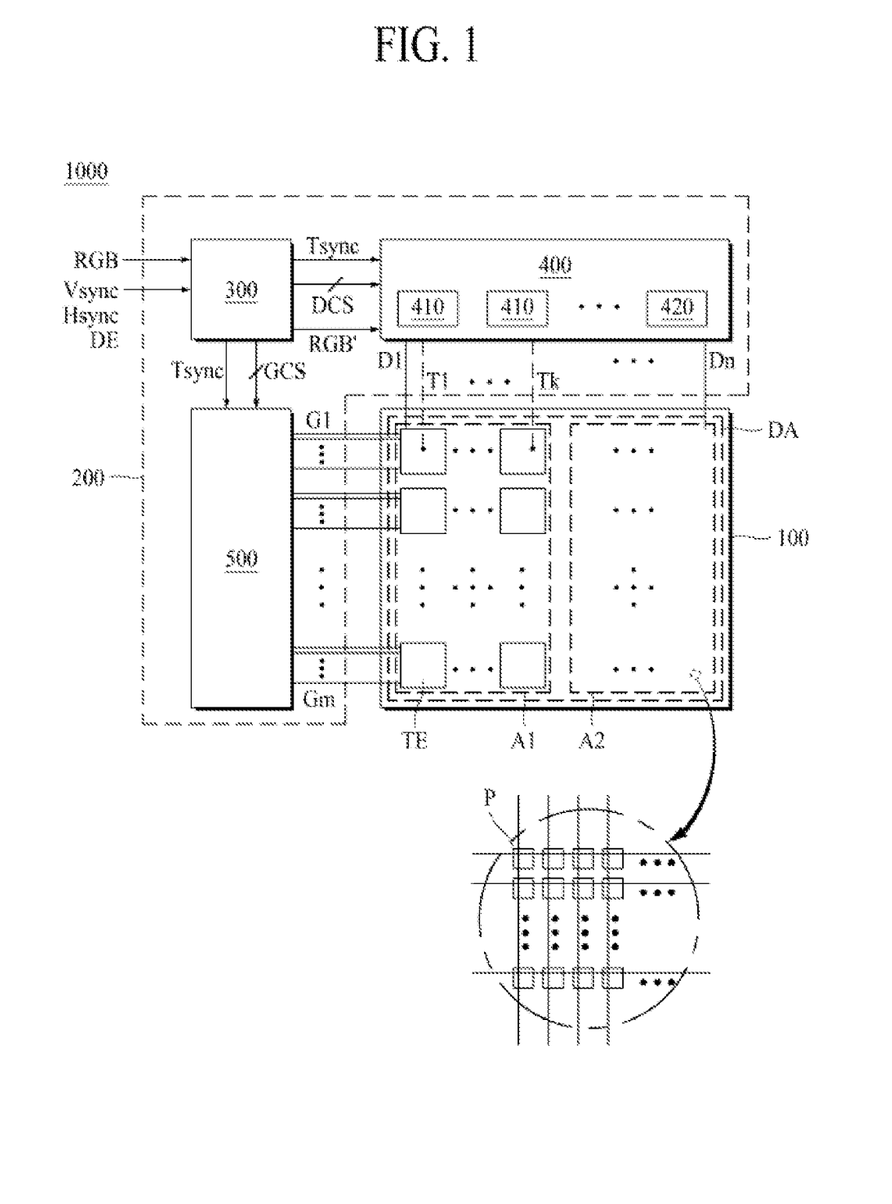
FIG. 1 is a view illustrating a configuration of a touch display device according to one embodiment of the present disclosure.
Figure 2:
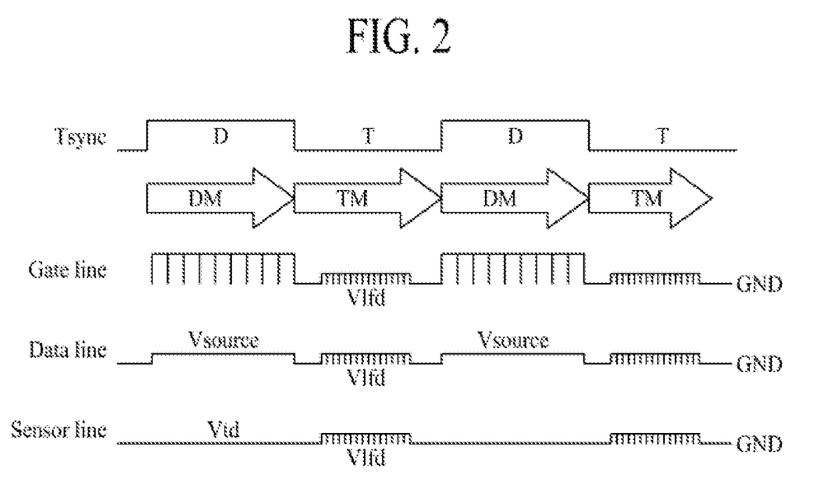
FIG. 2 is a waveform diagram of pixels and touch sensors of a display panel according to one embodiment of the present disclosure.
Figure 3:
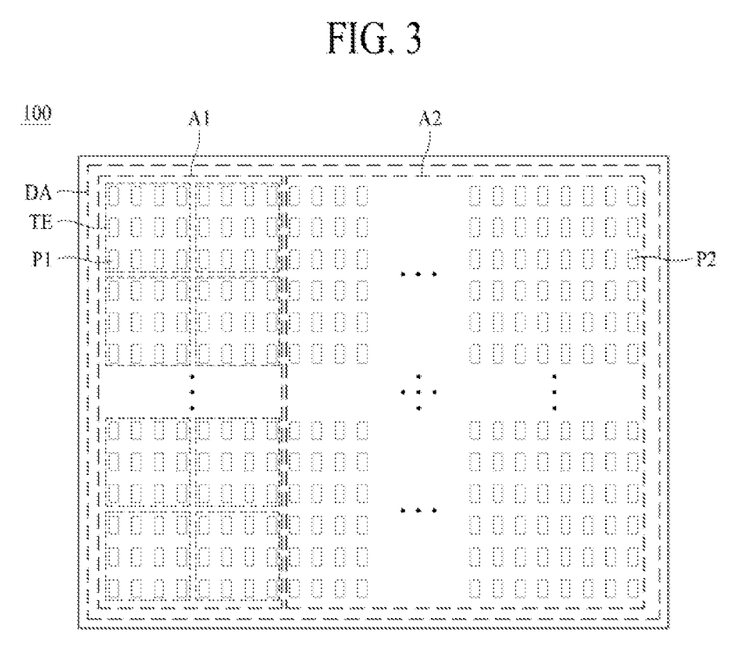
FIG. 3 is a view illustrating a configuration of a display panel according to one embodiment of the present disclosure.

Hereinafter, a touch display device according to the present disclosure will be described in detail with reference to FIGS. 1 to 3. FIG. 1 is a view illustrating a configuration of a touch display device according to one embodiment of the present disclosure, FIG. 2 is a waveform diagram of pixels and touch sensors of a display panel according to one embodiment of the present disclosure, and FIG. 3 is a view illustrating a configuration of a display panel according to one embodiment of the present disclosure.

Referring to FIG. 1, a touch display device 1000 according to one embodiment of the present disclosure includes a display panel 100 and a display drive device 200.

The display panel 100, which performs a display function and a touch sensing function, may be implemented as a flat panel display such as a liquid crystal display (LCD) or an organic light emitting diode (OLED) display.

The display panel 100 includes a plurality of gate lines G1 to Gm, a plurality of data lines D1 to Dn, a plurality of touch sensors TE, and a plurality of touch lines T1 to Tk.

Referring to FIG. 1, the plurality of gate lines G1 to Gm and the plurality of data lines D1 to Dn are located on a substrate to intersect each other so as to define a plurality of pixels P. Each of the plurality of pixels P may include a thin film transistor (TFT) connected to adjacent gate lines G1 to Gm and adjacent data lines D1 to Dn, a pixel electrode (not illustrated) connected to the TFT, and a storage capacitor (not illustrated) connected to the pixel electrode. As illustrated in FIG. 2, each of the plurality of gate lines G1 to Gm receives a scan pulse in a display mode DM. Each of the plurality of data lines D1 to Dn receives a source signal Vsource in the display mode DM.

The display panel 100 displays an image having a predetermined gradation or receives a touch. The display panel 100 may be an in-cell touch type display panel using a capacitive method. Alternatively, the display panel 100 may be an in-cell touch type display panel using a self-capacitance method or an in-cell touch type display panel using a mutual capacitance method.

Each of the plurality of touch sensors TE may serve as a touch electrode for sensing the touch or serve as a common electrode for driving a liquid crystal by forming an electric field together with the pixel electrode. That is, each of the plurality of touch sensors TE may be used as the touch electrode in a touch sensing mode TM and used as the common electrode COM in the display mode DM. Accordingly, each of the plurality of touch sensors TE may include a transparent conductive material.

Since each of the plurality of touch sensors TE is used as a self-capacitive touch sensor in the touch sensing mode TM, the touch sensor TE should have a size that is larger than a minimum contact size between a touch object and the display panel 100. Accordingly, each of the plurality of touch sensors TE may have a size corresponding to one or more pixels P. The plurality of touch sensors TE may be arranged at regular intervals along a plurality of horizontal lines and a plurality of vertical lines. In the plurality of touch sensors TE, each of the plurality of touch lines T1 to Tk supplies a common voltage to the corresponding touch sensor TE in the display mode DM. The plurality of touch lines T1 to Tk are each connected to one of the plurality of touch sensors TE.

As illustrated in FIG. 2, the display panel 100 may be driven in the display mode DM and the touch sensing mode TM. The display panel 100 displays an image in the display mode DM and serves as a touch panel for sensing a touch in the touch sensing mode TM. In this case, in the display mode DM, the display panel 100 receives a scan pulse through the gate lines G1 to Gm and receives a source signal Vsource through the data lines D1 to Dn.

The display panel 100 may receive a load-free signal Vlfd for performing load free driving (LFD) through the gate lines G1 to Gm, the data lines D1 to Dn, and the touch lines T1 to Tk in the touch sensing mode TM. In this case, the LFD means a method in which, in order to prevent formation of a parasitic capacitance between the touch electrode TE on which a touch detection process is performed and the touch electrode TE or pixel P located adjacent to the touch electrode TE, a signal identical or corresponding to a touch drive signal Vtd is applied to the touch electrode TE adjacent to the touch electrode TE on which the touch detection process is performed. For example, the load-free signal Vlfd may be a common voltage.

According to one embodiment of the present disclosure, as illustrated in FIG. 3, the display panel 100 includes a display area DA on which an image is displayed through the pixel P, and the display area DA is divided into a first area A1 that receives a touch and a second area A2 that does not receive a touch. In this case, a first pixel P1 and the touch sensor TE are located in the first area A1, and a second pixel P2 is located in the second area A2. That is, the touch sensor TE is not located in the second area A2. Accordingly, the first area A1, in which the first pixel P1 and the touch sensor TE are located, displays an image and receives a touch, and the second area A2, in which only the second pixel P2 is located, displays an image and does not receive a touch. In other words, in the first area A1, the first pixel P1 overlaps the touch sensor TE, and in the second area A2, the second pixel P2 does not overlap the touch sensor TE.

The display drive device 200 supplies, in the display mode DM, the source signal Vsource to the plurality of pixels P included in the display panel 100 to display an image through the display panel 100 and senses a touch through the touch sensors TE in the touch sensing mode TM.

Referring back to FIG. 1, the display drive device 200 includes a timing controller 300, an integrated drive unit 400, and a gate drive unit 500.

The timing controller 300 receives, from an external system (not illustrated), various timing signals including a vertical sync signal Vsync, a horizontal sync signal Hsync, a data enable (DE) signal, a clock signal (not illustrated), and the like and generates a data control signal (DCS) for controlling the integrated drive unit 400 and a gate control signal (GCS) for controlling the gate drive unit 500. Further, the timing controller 300 receives image data RGB from the external system, converts the image data RGB into image data RGB' in a form that may be processed by the integrated drive unit 400, and outputs the converted image data RGB'.

Meanwhile, the timing controller 300 may generate an internal data enable (iDE) signal by compressing an external data enable signal transmitted from a host system within a period driven in the preset display mode DM. As illustrated in FIG. 3, the timing controller 300 may generate a touch sync signal Tsync by which one frame period is time-divided into the display mode DM and the touch sensing mode TM in accordance with timings of the vertical sync signal Vsync and the iDE signal. The timing controller 300 may transmit the touch sync signal Tsync to the integrated drive unit 400 and the gate drive unit 500.

The host system converts digital image data into a format suitable for display on the display panel 100. The host system transmits the timing signals together with the digital image data to the timing controller 300. The host system is implemented as any one of a television system, a set-top box, a navigation system, a digital versatile disc player, a Blu-ray player, a personal computer (PC), a home theater system, and a phone system to receive an input image.

The integrated drive unit 400 drives the display panel 100 so that an image is displayed on the display panel 100 by supplying the source signal Vsource to the pixel P and drives the display panel 100 so that a touch is sensed through the touch sensors TE.

The integrated drive unit 400 includes a first drive integrated circuit 410 that displays an image by supplying the source signal Vsource to the first pixel P1 located in the first area A1 and senses a touch by detecting the presence or absence of the touch or calculating touch coordinates by receiving a touch sensing signal generated by the touch sensor TE of the first area A1 and a second drive integrated circuit 420 that is driven to display an image by supplying the source signal Vsource to the second pixel P2 located in the second area A2.

The integrated drive unit 400 according to one embodiment of the present disclosure will be described below in detail with reference to FIGS. 4 to 6.

The gate drive unit 500 receives a gate control signal GCS from the timing controller 300 in the display mode DM. The gate control signal GCS may include a gate start pulse GSP, a gate shift clock GSC, a gate output enable signal, and the like. The gate drive unit 500 generates a gate pulse (or a scan pulse) synchronized with a data signal through the received gate control signal GCS and shifts the generated gate pulse to sequentially supply the shifted gate pulse to the gate lines G1 to Gm. To this end, the gate drive unit 500 may include a plurality of gate drive ICs (not illustrated). The gate drive ICs sequentially supply a gate pulse synchronized with a data signal to the gate lines G1 to Gm under a control of the timing controller 300 in the display mode DM and selects the data lines D1 to Dn in which a data signal is written. The gate pulse swings between a gate high voltage and a gate low voltage.

In this case, the gate drive ICs may be arranged directly on the display panel 100 or integrated in the display panel 100 in a tape automated bonding (TAB) manner or a chip on glass (COG) manner.

The gate drive unit 500 may supply the load-free signal Vlfd for the LFD to the gate lines G1 to Gm without generating the gate pulse in the touch sensing mode TM. Accordingly, the gate lines G1 to Gm may, in the display mode DM, supply the gate pulse to the TFT of each pixel to sequentially select the data lines D1 to Dn in which the data signal is to be written in the display panel 100 and may, in the touch sensing mode TM, perform the LFD to maintain the load-free signal Vlfd so as to prevent variations in the outputs of the touch sensors.

Hereinafter, the integrated drive unit according to one embodiment of the present disclosure will be described in detail with reference to FIGS. 4 to 6.

Figure 4:
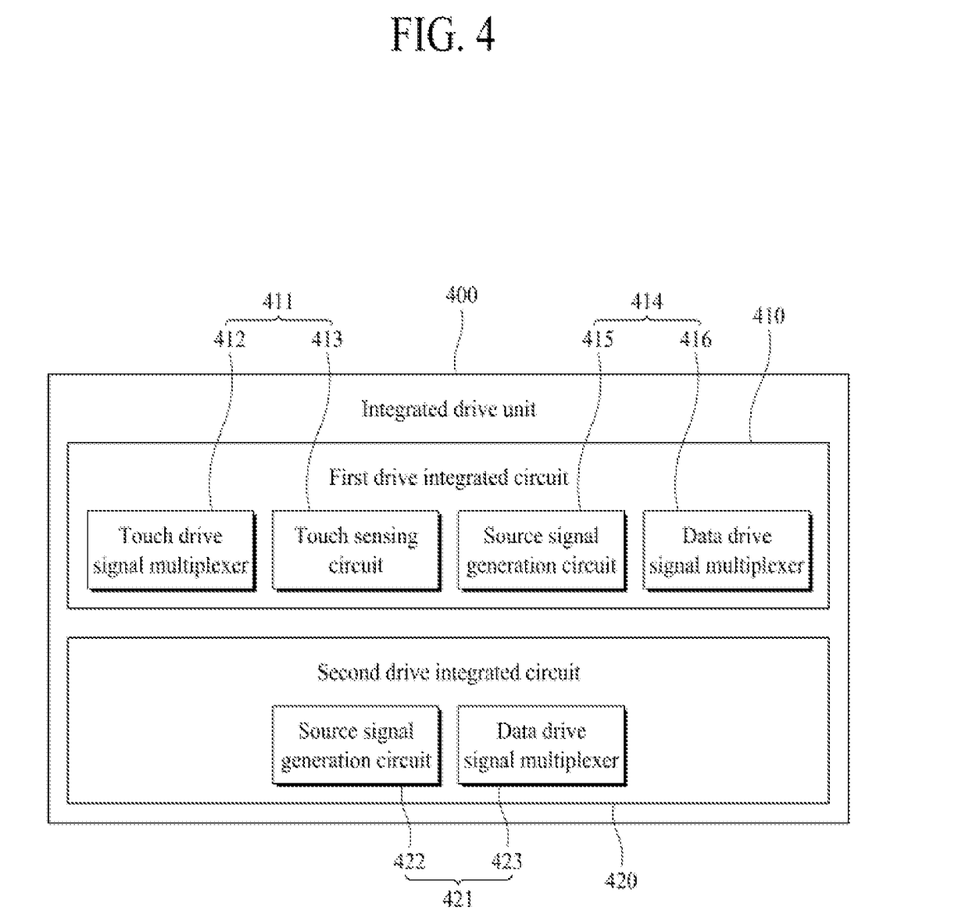
FIG. 4 is a block diagram illustrating a configuration of an integrated drive unit according to one embodiment of the present disclosure.
Figure 5:
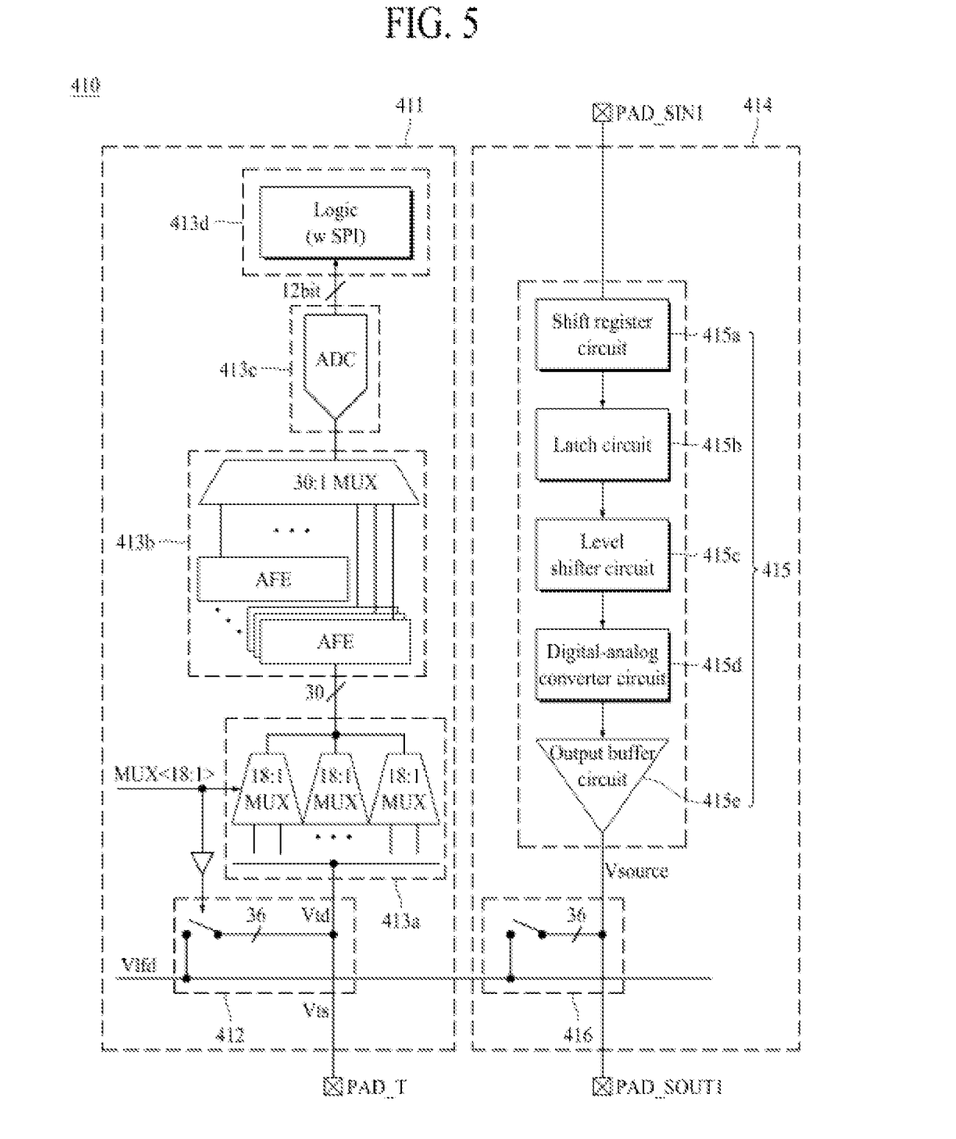
FIG. 5 is a view illustrating a configuration of a first drive integrated circuit according to one embodiment of the present disclosure.

FIG. 4 is a block diagram illustrating a configuration of an integrated drive unit according to one embodiment of the present disclosure, and FIG. 5 is a view schematically illustrating a configuration of a first drive integrated circuit according to one embodiment of the present disclosure. FIG. 6 is a view illustrating a configuration of a second drive integrated circuit according to one embodiment of the present disclosure.

As described above, the integrated drive unit 400 drives, in the display mode DM, the display panel 100 so that an image is displayed through the display panel 100 by supplying the source signal Vsource to the plurality of pixels P and drives, in the touch sensing mode TM, the display panel 100 so that a touch is sensed through the touch sensors TE.

Referring to FIG. 4, the integrated drive unit 400 includes the first drive integrated circuit 410 and the second drive integrated circuit 420.

The first drive integrated circuit 410 displays an image by supplying the source signal Vsource to the first pixel P1 located in the first area A1 and senses a touch by detecting the presence or absence of the touch or calculating touch coordinates by receiving the touch sensing signal generated by the touch sensor TE of the first area A1. Accordingly, the first drive integrated circuit 410, in the display mode DM, is connected to the first pixel P1 located in the first area A1 and supplies the source signal Vsource to the connected first pixel P1 and, in the touch sensing mode TM, receives the touch sensing signal from the touch sensor TE located in the first area A1.

Referring to FIGS. 4 and 5, the first drive integrated circuit 410 includes a touch drive circuit 411 and a data drive circuit 414.

In the touch sensing mode TM, the touch drive circuit 411 senses a touch by detecting the presence or absence of the touch or calculating the touch coordinates by receiving the touch sensing signal through the touch sensors TE located in the first area A1.

The touch drive circuit 411 includes a touch drive signal multiplexer 412 and a touch sensing circuit 413.

The touch drive signal multiplexer 412 selects one signal from a plurality of signals to transmit the selected signal to the sensor electrode TE or the touch sensing circuit 413. For example, as illustrated in FIG. 5, the touch drive signal multiplexer 412 may select one signal from a touch drive signal Vtd and the load-free signal Vlfd to transmit the selected signal to the sensor electrode TE or may select one signal from a touch sensing signal Vts and the load-free signal Vlfd to transmit the selected signal to the touch sensing circuit 413. In this case, the load-free signal Vlfd may have the same value as the common voltage for driving pixels. In this case, the one signal of the touch drive signal Vtd and the load-free signal Vlfd selected by the touch drive signal multiplexer 412 may be transmitted to the touch sensing circuit 413 through a touch pad PAD_T.

The touch sensing circuit 413 senses a touch through the touch sensors TE in the touch sensing mode TM. The touch sensing circuit 413 supplies the touch drive signal Vtd to the sensor electrode TE and senses a touch by using the touch sensing signal Vts that is a response signal to the supplied touch driving signal Vtd. In detail, when the display panel 100 is implemented as a mutual capacitance type, the touch sensing circuit 413 may include a drive signal generation circuit that generates the touch drive signal Vtd for driving the touch sensor TE and supplies the generated touch drive signal Vtd to the touch sensors TE through the touch lines T1 to Tk, and a sensing circuit that generates a touch sensing signal Vts by sensing changes in the capacitances of the touch sensors TE through the touch lines T1 to Tk. Alternatively, when the display panel 100 is implemented as a self-capacitance type, the touch sensing circuit 413 may use one circuit to supply the touch drive signal Vtd to the touch sensors TE and acquire the touch sensing signal Vts from the touch sensors TE.

Referring to FIG. 5, the touch sensing circuit 413 includes a sensor selection unit 413a, an analog front end part 413b, an analog-digital conversion unit 413c, and a digital processing unit 413d.

The sensor selection unit 413a may select the touched touch sensor TE and transmit one signal among the plurality of signals to the selected touch sensor TE. To this end, as illustrated in FIG. 5, the sensor selection unit 413a may include a plurality of multiplexers.

The analog front end part 413b may include a circuit such as an amplifier and a correlated double sampling (CDS) circuit. Further, the analog front end part 413b may further include a circuit that demodulates the response signal using a demodulation signal.

The analog-digital conversion unit 413c may convert an output of the analog front end part 413b to generate a touch sensing low signal.

The digital processing unit 413d may generate a touch sensing signal using the touch sensing low signal.

According to one embodiment of the present disclosure, the touch drive circuit 411 of the first drive integrated circuit 410 transmits or receives one signal among the touch drive signal Vtd, the load-free signal Vlfd, and the touch sensing signal Vts to or from the touch sensor TE located in the first area A1 through the touch drive signal multiplexer 412 according to a mode of the display panel 100. In this case, the one signal among the touch drive signal Vtd, the load-free signal Vlfd, and the touch sensing signal Vts selected by the touch drive signal multiplexer 412 may be transmitted or received through the touch pad PAD_T.

The data drive circuit 414 of the first drive integrated circuit 410 supplies the source signal Vsource to the first pixel P1 located in the first area A1. In detail, the data drive circuit 414 of the first drive integrated circuit 410 receives, through a first data input pad part PAD_SIN1, a timing signal generated by the timing controller 300 and converts the image data RGB' into the source signal Vsource according to the input timing signal. The data drive circuit 414 of the first drive integrated circuit 410 converts the image data RGB' into the source signal Vsource according to a source start pulse, a source sampling clock, and a source output enable signal. The data drive circuit 414 of the first drive integrated circuit 410 outputs, to the data lines D1 to Dn through a first data output pad part PAD_SOUT1, the source signal Vsource corresponding to one horizontal line for each horizontal period during which a gate signal is supplied to a gate line.

In this case, the data drive circuit 414 may receive a gamma voltage from a gamma voltage generation unit (not illustrated) and convert the image data RGB' into the source signal Vsource by using the gamma voltage.

Referring back to FIGS. 4 and 5, the data drive circuit 414 includes a source signal generation circuit 415 and a data drive signal multiplexer 416.

As illustrated in FIG. 5, the source signal generation circuit 415 includes a shift register circuit 415a, a latch circuit 415b, a level shifter circuit 415c, a digital-analog converter circuit 415d, and an output buffer circuit 415e.

The shift register circuit 415a receives the source start pulse and the source sampling clock from the timing controller 300, sequentially shifts the source start pulse according to the source sampling clock, and outputs a sampling signal. The shift register circuit 415a transmits the sampling signal to the latch circuit 415b.

The latch circuit 415b sequentially samples and latches the image data RGB' by predetermined units according to the sampling signal. The latch circuit 415b transmits the latched image data RGB' to the level shifter circuit 415c.

The level shifter circuit 415c amplifies the level of the lathed image data RGB'. In detail, the level shifter circuit 415c amplifies the level of the image data RGB' to a level that may be driven by the digital-analog converter circuit 415d. The level shifter circuit 415c transmits the level-amplified image data RGB' to the digital-analog converter circuit 415d.

The digital-analog converter circuit 415d converts the image data RGB' into the source signal Vsource that is an analog signal. The digital-analog converter circuit 415d transmits, to the output buffer circuit 415e, the source signal Vsource converted into the analog signal.

The output buffer circuit 415e outputs the source signal Vsource to the data drive signal multiplexer 416. In detail, the output buffer circuit 415e buffers the source signal Vsource according to the source output enable signal generated by the timing controller 300 and outputs the buffered source signal Vsource to the data drive signal multiplexer 416.

The data drive signal multiplexer 416 may select one signal among the plurality of signals and transmit the selected signal to the first pixel P1 connected to the data lines D1 to Dn. For example, the data drive signal multiplexer 416 may select one among the source signal Vsource and the load-free signal Vlfd and transmit the selected signal to the first pixel P1 connected to the data lines D1 to Dn through the first data output pad part PAD_SOUT1. In detail, one among the source signal Vsource and the load-free signal Vlfd selected by the data drive signal multiplexer 416 may be transmitted to the first pixel P1 located in the first area A1 through the first data output pad part PAD_SOUT1. In this case, the load-free signal Vlfd may have the same value as the common voltage.

In the display mode DM, the second drive integrated circuit 420 is driven to supply the source signal Vsource to the second pixel P2 located in the second area A2 through a second data output pad part PAD_SOUT2 so as to display an image.

The second drive integrated circuit 420 includes a data drive circuit 421.

Figure 6:
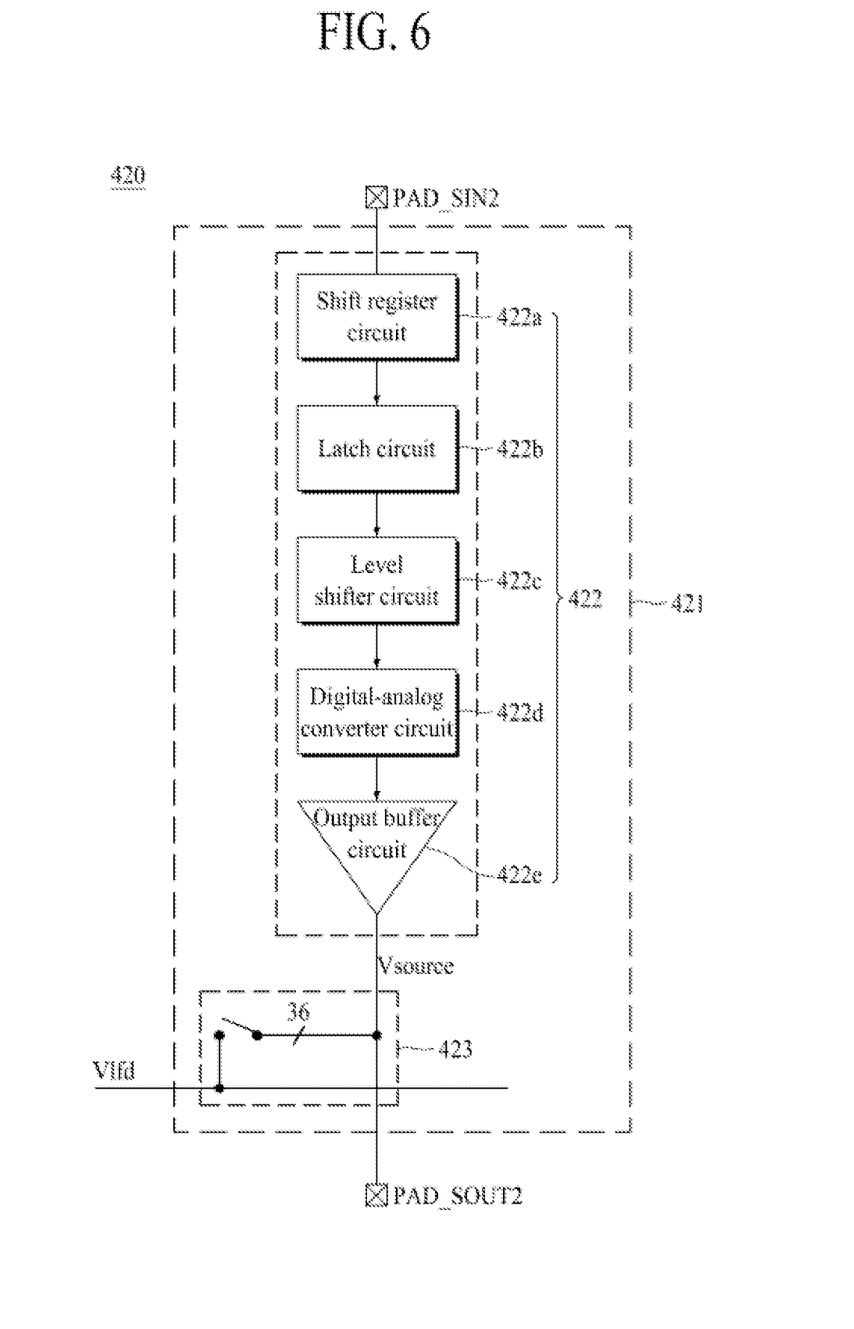
FIG. 6 is a view illustrating a configuration of a second drive integrated circuit according to one embodiment of the present disclosure.

According to one embodiment of the present disclosure, as illustrated in FIGS. 4 and 6, the data drive circuit 421 of the second drive integrated circuit 420 includes a source signal generation circuit 422 and a data drive signal multiplexer 423 that are the same as the source signal generation circuit 415 and the data drive signal multiplexer 416 that are components of the data drive circuit 414 of the first drive integrated circuit 410. That is, the data drive circuit 421 of the second drive integrated circuit 420 has the same component as that of the data drive circuit 414 of the first drive integrated circuit 410 and performs the same function as that of the data drive circuit 414 of the first drive integrated circuit 410. That is, the data drive circuit 421 of the second drive integrated circuit 420 supplies the source signal Vsource to the second pixel P2 located in the second area A2. In detail, the data drive circuit 421 of the second drive integrated circuit 420 receives, through a second data input pad part PAD_SIN2, a timing signal generated by the timing controller 300, and converts the image data RGB' into the source signal Vsource according to the input timing signal. The data drive circuit 421 of the second drive integrated circuit 420 converts the image data RGB' into the source signal Vsource according to the source start pulse, the source sampling clock, and the source output enable signal. The data drive circuit 421 of the second drive integrated circuit 420 outputs, to the data lines D1 to Dn through the second data output pad part PAD_SOUT2, the source signal Vsource corresponding to one horizontal line for each horizontal period during which a gate signal is supplied to a gate line.

According to one embodiment of the present disclosure, the data drive circuit 421 of the second drive integrated circuit 420 has the same resistance value as that of the data drive circuit 414 of the first drive integrated circuit 410. In detail, the resistance between the first data input pad part PAD_SIN1 of the first drive integrated circuit 410 and the first data output pad part PAD_SOUT1 of the first drive integrated circuit 410 and the resistance between the second data input pad part PAD_SIN2 of the second drive integrated circuit 420 and the second data output pad part PAD_SOUT2 of the second drive integrated circuit 420 may have the same value.

The source signal generation circuit 422 of the second drive integrated circuit 420 has the same component as that of the source signal generation circuit 415 of the first drive integrated circuit 410. That is, as illustrated in FIG. 6, the source signal generation circuit 422 of the second drive integrated circuit 420 includes a shift register circuit 422a, a latch circuit 422b, a level shifter circuit 422c, a digital-analog converter circuit 422d, and an output buffer circuit 422e.

Further, the data drive signal multiplexer 423 of the second drive integrated circuit 420 may be the same as the data drive signal multiplexer 416 of the first drive integrated circuit 410. Accordingly, the data drive signal multiplexer 423 of the second drive integrated circuit 420 may have the same resistance value as that of the data drive signal multiplexer 416 of the first drive integrated circuit 410. That is, the resistance between the output buffer circuit 415e of the first drive integrated circuit 410 and the first data output pad part PAD_SOUT1 of the first drive integrated circuit 410 may have the same value of that of the resistance between the output buffer circuit 422e of the second drive integrated circuit 420 and the second data output pad part PAD_SOUT2 of the second drive integrated circuit 420.

Further, the data drive signal multiplexer 423 of the second drive integrated circuit 420 may select one signal among the plurality of signals and transmit the selected signal to the second pixel P2 connected to the data lines D1 to Dn through the second data output pad part PAD_SOUT2. For example, the data drive signal multiplexer 423 of the second drive integrated circuit 420 may select one signal among the source signal Vsource and the load-free signal Vlfd and transmit the selected signal to the second pixel P2 connected to the data lines D1 to Dn through the second data output pad part PAD_SOUT2. Accordingly, in the display mode DM, the data drive circuit 414 of the first drive integrated circuit 410 and the data drive circuit 421 of the second drive integrated circuit 420 have the same resistance value, and thus the image may be uniformly displayed on the display panel 100. In detail, in the display mode DM, the resistance between the first data input pad part PAD_SIN1 of the first drive integrated circuit 410 and the first data output pad part PAD_SOUT1 of the first drive integrated circuit 410 and the resistance between the second data input pad part PAD_SIN2 of the second drive integrated circuit 420 and the second data output pad part PAD_SOUT2 of the second drive integrated circuit 420 may have the same value. Further, in the display mode DM, the resistance between the output buffer circuit 415e of the first drive integrated circuit 410 and the first data output pad part PAD_SOUT1 of the first drive integrated circuit 410 may have the same value of that of the resistance between the output buffer circuit 422e of the second drive integrated circuit 420 and the second data output pad part PAD_SOUT2 of the second drive integrated circuit 420.

According to one embodiment of the present disclosure, the first drive integrated circuit 410 includes the touch drive circuit 411 and the data drive circuit 414, the second drive integrated circuit 420 includes only the data drive circuit 421, and thus the area of the first drive integrated circuit 410 may be larger than the area of the second drive integrated circuit 420.

A touch display device according to the present disclosure is driven by a first drive integrated circuit including a data drive circuit and a touch drive circuit and a second drive integrated circuit including a data drive circuit. Thus, the area of a drive device for driving the touch display device that receives a touch in a partial region can be reduced and the weight thereof can be reduced.

Further, in the touch display device according to the present disclosure, since the data drive circuit of the first drive integrated circuit has components that are the same as those of the data drive circuit of the second drive integrated circuit and thus the data drive circuits of the first and second drive integrated circuits have the same resistance value, the touch display device according to the present disclosure can uniformly display an image.

It will be apparent to those skilled in the art that various changes and modifications may be made without departing from the spirit and scope of the disclosure.

In addition, at least a part of the methods described herein may be implemented using one or more computer programs or components. These components may be provided as a series of computer instructions through a computer-readable medium or a machine-readable medium, which includes volatile and non-volatile memories. The instructions may be provided as software or firmware and may be entirely or partially implemented in a hardware configuration such as application specific integrated circuits (ASICs), field programmable gate arrays (FPGAs), digital signal processors (DSPs), or other similar devices. The instructions may be configured to be executed by one or more processors or other hardware components, and when one or more processors or other hardware components execute the series of computer instructions, one or more processors or other hardware components may entirely or partially perform the methods and procedures disclosed herein.

Therefore, it should be understood that the above-described embodiments are not restrictive but illustrative in all aspects. The scope of the present disclosure is defined by the appended claims rather than the detailed description, and it should be construed that all alternations or modifications derived from the meaning and scope of the appended claims and the equivalents thereof fall within the scope of the present disclosure.

What is claimed is:
1. A touch display device comprising:
a first drive integrated circuit configured to output a source signal and receives a touch sensing signal; and
a second drive integrated circuit configured to output the source signal,
wherein the first drive integrated circuit outputs the source signal in a display mode and receives the touch sensing signal in a touch sensing mode,
the second drive integrated circuit outputs the source signal in the display mode, and the first drive integrated circuit and the second drive integrated circuit have the same resistance value in the display mode.

2. The touch display device of claim 1, further comprising a timing controller configured to outputs a timing signal to the first drive integrated circuit and the second drive integrated circuit,
wherein the first drive integrated circuit and the second drive integrated circuit are driven in the display mode or the touch sensing mode,
in the display mode, the first drive integrated circuit receives the timing signal through a first data input pad and supplies the source signal through a first data output pad, and the second drive integrated circuit receives the timing signal through a second data input pad and supplies the source signal through a second data output pad, and
a resistance between the first data input pad and the first data output pad has the same value as a resistance between the second data input pad and the second data output pad.

3. The touch display device of claim 1, wherein the first drive integrated circuit includes a data drive circuit configured to supply the source signal and a touch drive circuit configured to supply a touch drive signal,
the second drive integrated circuit includes a data drive circuit configured to supply the source signal, and
the data drive circuit of the first drive integrated circuit and the data drive circuit of the second drive integrated circuit have the same resistance value.

4. The touch display device of claim 3, further comprising a timing controller configured to output a timing signal to the first drive integrated circuit and the second drive integrated circuit,
wherein the data drive circuit of the first drive integrated circuit receives the timing signal through a first data input pad and supplies the source signal through a first data output pad,
the data drive circuit of the second drive integrated circuit receives the timing signal through a second data input pad and supplies the source signal through a second data output pad, and
a resistance between the first data input pad and the first data output pad has the same value as a resistance between the second data input pad and the second data output pad.

5. The touch display device of claim 1, wherein the first drive integrated circuit and the second drive integrated circuit are driven in a display mode or a touch sensing mode,
the first drive integrated circuit includes a first data drive circuit configured to supply the source signal in the display mode and a touch drive circuit that supplies a touch drive signal in the touch sensing mode,
the second drive integrated circuit includes a second data drive circuit that supplies the source signal in the display mode, and
when the first drive integrated circuit and the second drive integrated circuit are driven in the display mode, the first data drive circuit has the same resistance as the second data drive circuit.

6. The touch display device of claim 1, further comprising a display panel including a first region in which a first pixel and a touch sensor are located and a second region in which a second pixel is located,
wherein the first pixel overlaps the touch sensor, and the second pixel does not overlap the touch sensor.

7. The touch display device of claim 6, further comprising a timing controller configured to output a timing signal to the first drive integrated circuit and the second drive integrated circuit,
wherein the first drive integrated circuit and the second drive integrated circuit are driven in the display mode or the touch sensing mode,
in the display mode, the first drive integrated circuit receives the timing signal through a first data input pad and supplies the source signal configured to the first pixel through a first data output pad, and the second drive integrated circuit receives the timing signal through a second data input pad and supplies the source signal to the second pixel through a second data output pad, and
a resistance between the first data input pad and the first data output pad has the same value as a resistance between the second data input pad and the second data output pad.

8. The touch display device of claim 1, wherein the first drive integrated circuit includes a first data drive circuit configured to supply the source signal and a touch drive circuit configured to supply a touch drive signal,
the second drive integrated circuit includes a second data drive circuit configured to supply the source signal, and
the second data drive circuit is the same as the first data drive circuit.

9. The touch display device of claim 1, wherein the first drive integrated circuit includes a first data multiplexer configured to select one among a plurality of signals, and
the second drive integrated circuit includes a second data multiplexer configured to select one among the plurality of signals.

10. The touch display device of claim 1, wherein the first drive integrated circuit includes:
a shift register circuit configured to output a sampling signal;
a latch circuit configured to sequentially sample and latch image data according to the sampling signal
a level shifter circuit configured to amplify the latched image data;
a digital-analog converter circuit configured to convert the amplified image data into the source signal configured to be an analog signal;
an output buffer circuit configured to output the source signal to a data line; and
a first data multiplexer configured to select one among the source signal and a load-free drive signal according to the modes of display panel and outputs the selected signal, and
the second drive integrated circuit includes:
a shift register circuit configured to output a sampling signal;
a latch circuit configured to sequentially sample and latch the image data according to the sampling signal;
a level shifter circuit configured to amplify the latched image data;
a digital-analog converter circuit configured to convert the amplified image data into the source signal configured to be an analog signal;
an output buffer circuit configured to output the source signal to a data line; and
a second data multiplexer configured to select one among the source signal and the load-free drive signal according to the modes of display panel and outputs the selected signal.

11. The touch display device of claim 10, wherein the first data multiplexer has the same resistance as the second data multiplexer.

12. The touch display device of claim 10, further comprising a timing controller configured to output a timing signal to the first drive integrated circuit and the second drive integrated circuit,
- wherein the first data multiplexer of the first drive integrated circuit selects one among the source signal and the load-free drive signal and outputs the selected signal through a first data output pad,
- the second data multiplexer of the second drive integrated circuit selects one among the source signal and the load-free drive signal and outputs the selected signal through a second data output pad, and
- a resistance between the output buffer circuit and the first data output pad of the first drive integrated circuit has the same value as a resistance between the output buffer circuit and the second data output pad of the second drive integrated circuit.

13. The touch display device of claim 1, wherein the first drive integrated circuit and the second drive integrated circuit are driven in the display mode or the touch sensing mode,
- the first drive integrated circuit outputs the source signal in the display mode and outputs a touch drive signal for sensing a touch in the touch sensing mode, and
- the second drive integrated circuit outputs the source signal in the display mode and outputs a load-free drive signal in the touch sensing mode.

14. The touch display device of claim 1, wherein the first drive integrated circuit and the second drive integrated circuit are driven in the display mode or the touch sensing mode,
- the first drive integrated circuit includes a first data drive circuit configured to supply the source signal and a touch drive circuit configured to supply a touch drive signal,
- the second drive integrated circuit includes a second data drive circuit configured to supply the source signal,
- in the display mode, the first data drive circuit outputs the source signal, and the second data drive circuit outputs the source signal, and
- in the touch sensing mode, the first data drive circuit and the second data drive circuit output a load-free drive signal, and the touch drive circuit outputs the touch drive signal to a touch sensor or receives the touch sensing signal from the touch sensor.

* * * * *